United States Patent
Tozer et al.

(10) Patent No.: US 9,641,791 B2
(45) Date of Patent: May 2, 2017

(54) BANDWIDTH AWARE DIGITAL VIDEO RECORDING (DVR) SCHEDULING

(71) Applicant: Microsoft Corporation, Redmond, WA (US)

(72) Inventors: Mark Tozer, Lake Mary, FL (US); Bharath Shetty, Sunnyvale, CA (US); Saul Wyner, Sunnyvale, CA (US); Yvonne Ellefson, Ben Lomond, CA (US); Jeffery C. Truong, San Francisco, CA (US); Tim Lett, Aventura, FL (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

(21) Appl. No.: 14/195,650

(22) Filed: Mar. 3, 2014

(65) Prior Publication Data

US 2015/0249803 A1    Sep. 3, 2015

(51) Int. Cl.
*H04N 5/76*    (2006.01)
*H04N 5/781*    (2006.01)
(Continued)

(52) U.S. Cl.
CPC ......... *H04N 5/781* (2013.01); *H04N 21/4334* (2013.01); *H04N 21/44209* (2013.01);
(Continued)

(58) Field of Classification Search
CPC ................................. H04N 5/76; H04N 9/80
(Continued)

(56) References Cited

U.S. PATENT DOCUMENTS 6,671,454 B1 * 12/2003 Kaneko et al. ............... 386/291
7,567,565 B2    7/2009 La Joie
(Continued)

FOREIGN PATENT DOCUMENTS

EP    1003301 A2    5/2000
EP    2469850 A2    6/2012

OTHER PUBLICATIONS

"International Search Report and Written Opinion Issued in PCT Patent Application No. PCT/US2015/017875", Mailed Date: Jun. 15, 2015, (14 Pages total).
(Continued)

*Primary Examiner* — Daquan Zhao
(74) *Attorney, Agent, or Firm* — Karin L. Williams; Mayer & Williams PC

(57) ABSTRACT

A scheduler is used to identify a schedule conflict that affects a client device receiving multiple media programs over a network. The scheduler is associated with the client device or a head-end source from which the programs are received. The scheduler accesses a schedule, which specifies a scheduled time at which multiple media programs are to be received by the client device. The scheduler obtains the actual bitrate to be consumed by each of the media programs as they are to be streamed to the client device. Based at least in part on the bitrates obtained for each of the media programs, the scheduler identifies a conflict that prevents at least one of the media programs from being streamed to the client device over the network. The scheduler enumerates at least one solution to the conflict to thereby resolve the conflict.

18 Claims, 4 Drawing Sheets

(51) Int. Cl.
*H04N 21/433* (2011.01)
*H04N 21/442* (2011.01)
*H04N 21/458* (2011.01)
*H04N 21/472* (2011.01)
*H04N 21/6547* (2011.01)
*H04N 9/80* (2006.01)

(52) U.S. Cl.
CPC ... *H04N 21/4583* (2013.01); *H04N 21/47214* (2013.01); *H04N 21/6547* (2013.01)

(58) Field of Classification Search
USPC ....... 386/291, 292, 293, 294, 295, 296, 297, 386/239, 248
See application file for complete search history.

(56) References Cited

U.S. PATENT DOCUMENTS

| 7,584,497 | B2 | 9/2009 | Potrebic et al. | |
|---|---|---|---|---|
| 8,189,472 | B2 | 5/2012 | Mcdonald et al. | |
| 8,375,414 | B2 | 2/2013 | Covey | |
| 2006/0268099 | A1* | 11/2006 | Potrebic et al. | 348/14.01 |
| 2009/0028192 | A1 | 1/2009 | Rieger et al. | |
| 2009/0142036 | A1* | 6/2009 | Branam et al. | 386/83 |
| 2013/0301700 | A1* | 11/2013 | Kwon | H04N 19/172 375/240.02 |
| 2015/0229584 | A1* | 8/2015 | Okamoto et al. | 386/83 |

OTHER PUBLICATIONS

"Motorola Online DVR Manager", Published on: May 28, 2012, Available at: http://www.myaccount.charter.com/customers/support.aspx?supportarticleid=2838 (9 pages total).

"Second Written Opinion Issued in PCT Application No. PCT/US2015/017875", Mailed Date: Nov. 19, 2015, (6 Pages total).

"International Preliminary Report on Patentability Issued in PCT Patent Application No. PCT/US2015/017875", Mailed Date: Jun. 10, 2016, 9 Pages.

* cited by examiner

BANDWIDTH AWARE DIGITAL VIDEO RECORDING (DVR) SCHEDULING

BACKGROUND

Conventional digital video recorder (DVR) functionality uses a scheduler. A scheduler comprises functionality which coordinates the recordation of media programs. The scheduler performs this task by creating a schedule and the DVR then records the media programs identified in the schedule. More specifically, the schedule includes entries which identify the respective media programs. The entries include timing-related information and other data which governs the recording of the corresponding media programs.

Occasionally, a user attempts to add an entry to the schedule which conflicts with one or more pre-existing entries. For example, consider the case in which a client device employs a conventional physical tuner to receive media information from a head-end source. This tuner can only tune to and receive one media program at any given time (e.g., by tuning to a prescribed frequency that carries the media program). Thus, if the user adds an entry to the schedule which identifies a media program which temporally overlaps the airing of another media program, then a conflict is created, because the tuner cannot tune to and receive two media programs at one time. The scheduler can resolve this conflict by alerting the user to the conflict and requesting the user to select either of the conflicting media programs.

A more complex client device can employ multiple tuners that allow the client device to receive and record multiple media programs at the same time. Such devices may employ multiple physical turners, or alternatively, a virtual tuner that receives a variable number of digital media programs by "tuning" to these streams in a unicast and/or multicast fashion. When a virtual tuner is employed, instead of being limited by the number of physical tuners it incorporates, the number of media programs a client device can generally receive is limited by a variety of factors such as the processing capabilities of the client device and the network throughput, for example.

However, conflict resolution for client devices that employ virtual tuners that can receive and record multiple media programs does not fundamentally depart from the basic paradigm used by the single-tuner case. Namely, the scheduler determines whether, at any given time, the client device can simultaneously receive and record all of the media programs identified in the schedule. If, at any given time, the number of media programs to be recorded exceeds the number that can actually be recorded, a conflict exists. The scheduler may attempt to resolve the conflict in the manner specified above, that is, by alerting the user to the conflict and prompting the user to eliminate one or more entries in the schedule to remove the assessed conflicts.

However, conflict resolution may be more complex in a client device that employs virtual tuner functionality. This is because the client device is constrained by the total amount of available bandwidth, rather than the total number of available physical tuners. This allows for many more degrees of freedom in creating and modifying a schedule compared to the traditional scheduling paradigm described above. For example, any event that consumes a portion of the available bandwidth can potentially cause a conflict in a schedule, and a change made to one part of the schedule can propagate through the schedule, mandating that potentially complex changes be made to other entries in the schedule.

SUMMARY

In one implementation, a system and method is described for identifying a schedule conflict that affects a client device receiving multiple media programs over a network. A scheduler associated with the client device or a head-end source from which the programs are received accesses a schedule, which specifies a scheduled time at which multiple media programs are to be received by the client device. The scheduler obtains the actual bitrate to be consumed by each of the media programs as they are to be streamed to the client device. Based at least in part on the bitrates obtained for each of the media programs, the scheduler identifies a conflict that prevents at least one of the media programs from being streamed to the client device over the network. The scheduler enumerates at least one solution to the conflict to thereby resolve the conflict.

In one particular implementation, the solution that is enumerated involves identifying one or more of the scheduled media programs that may be canceled to resolve the conflict and presenting those programs to the user, who can select which one(s) is to be canceled. The media programs that may be canceled may be identified in accordance with a set of pre-established rules. For example, one rule may give higher priority to recording media programs associated with a series that has been scheduled for recording by the client device. Other programs with lower priority would be canceled before such series media programs. As another example, High Definition (HD) media programs may be given priority over standard definition (SD) media programs.

This summary is provided to introduce simplified concepts that are further described below in the Detailed Description. This summary is not intended to identify essential features of the claimed subject matter, nor is it intended for use in determining the scope of the claimed subject matter.

DETAILED DESCRIPTION

Figure 1:
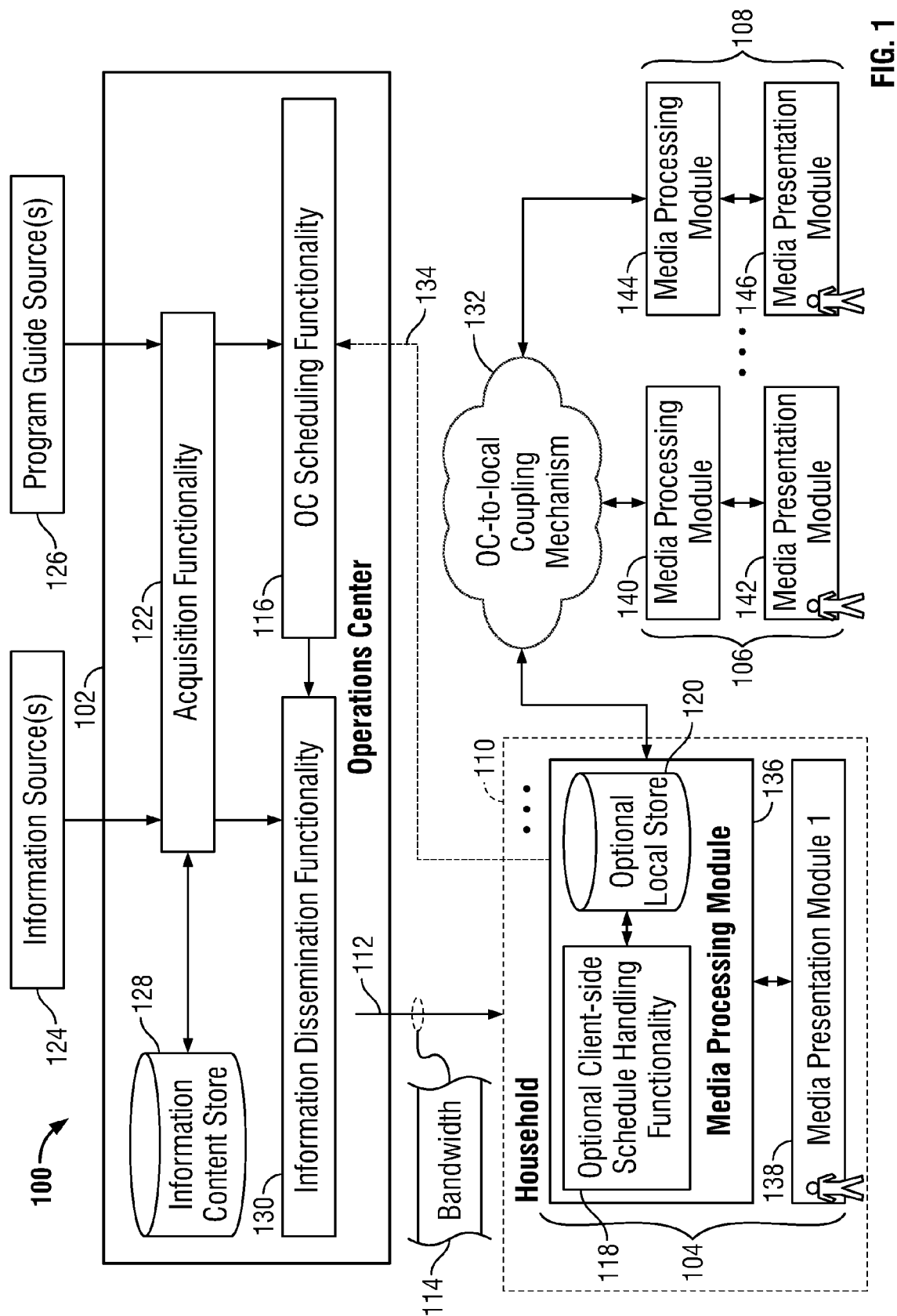
FIG. 1 shows a system in which a head-end operations center delivers media programs to a plurality of client devices.

The following description sets forth scheduling functionality for scheduling the processing (e.g., recordation) of media programs for a client device that employs virtual tuner functionality. The virtual tuner functionality tunes to one or more media programs in virtual fashion, and can simultaneously record multiple media programs, the maximum number of which is limited only by the head-end source. In addition to limiting the maximum number of media programs, the head-end source generally also limits the maximum bandwidth that may be used by those media programs. In other words, a client device that uses virtual tuner functionality can "carve up" the available bandwidth in a variety of different ways to consume multiple media programs up to some maximum that may be specified by the head-end source. This capability introduces additional degrees of freedom in constructing schedules, and thus makes the task of scheduling media programs more complex. The scheduling functionality described herein effectively addresses this added complexity.

As to terminology, the term "media information" refers to any data represented in electronic form that can be consumed by a user. The media information can include any information that conveys audio and/or video information, such as audio resources (e.g., music, spoken word subject matter, etc.), still picture resources (e.g., digital photographs, etc.), moving picture resources (e.g., audio-visual television media programs, movies, etc.), and so on.

The term "media program" represents any unit of media information that can be consumed by a client device. For example, a media program may represent a television media program, a movie, a piece of music, and so forth.

The term "client device" refers to any unit for processing and presenting media information. For example, the client device can comprise a set-top box module, a digital video recorder (DVR), a rewritable digital video disc (DVD-RW) device, a television device with integrated media processing functionality, a computer, smartphone or tablet equipped with media processing functionality, and so forth, or some combination of such devices.

The term "schedule" refers to a collection of entries that specify salient information regarding media programs to be recorded. For example, the entries specify the timing at which media programs will begin and end. The entries may also specify the sources (e.g., channels) that will provide the media programs and other potential characteristics of the media programs. Generally, information presented in the schedule is referred to as "schedule information" herein.

The term "media program guide" refers to master schedule information which defines the timing of media programs delivered by a plurality of different sources (e.g., channels). The term "media program guide information" generally refers to information presented in the media program guide. The media program guide information may comprise electronic media program guide (EPG) information that is updated on a periodic basis.

Illustrative Operating Environment

Generally, any of the functions described with reference to the figures can be implemented using software, firmware (e.g., fixed logic circuitry), manual processing, or a combination of these implementations. The term "programming logic, "module" or "functionality" as used herein generally represents software, firmware, or a combination of software and firmware. For instance, in the case of a software implementation, the term "programming logic," "module," or "functionality" represents media program code (and/or declarative-type instructions) that performs specified tasks when executed on a processing device or devices (e.g., CPU or CPUs). The media program code can be stored in one or more computer readable memory devices. More generally, the illustrated separation of logic, modules and functionality into distinct units may reflect an actual physical grouping and allocation of such software and/or hardware, or can correspond to a conceptual allocation of different tasks performed by a single software media program and/or hardware unit. The illustrated logic, modules and functionality can be located at a single site (e.g., as implemented by a processing device), or can be distributed over plural locations.

FIG. 1 shows a system 100 in which a head-end operations center (OC) 102 delivers media programs to a plurality of client devices (104, 106, . . . 108). The representative client device 104 is located in a household 110. The household 110 can potentially include additional client devices (not shown). For example, the household 110 can potentially include different client devices located in different respective rooms of the household 110. In the following discussion, the features of the invention will be described with respect to the representative client device 104 located in household 110; but the identified features apply with equal force to other client devices and households.

The operation center 102 uses a communication channel ("channel") 112 to deliver media information to the exemplary household 110. The channel 112 includes a prescribed amount of bandwidth 114 for streaming media information to the household 114. The term "bandwidth" refers to the amount of information that can be transmitted over the channel 112 in a given amount of time. In one case, the operations center 102 transmits information over the channel 112 at a constant data rate equal to the bandwidth 114. In another case, the operations center 102 transmits information over the channel 112 at a variable rate which is capped by the bandwidth 114. In any case, the channel 112 can be metaphorically viewed as a communications pipe having a "diameter" defined by the bandwidth 114, which controls the maximum amount of information that can flow through the pipe at any given time.

The bandwidth 114 can accommodate the delivery of plural identified streams of media information to the household 110. This enables a single client device 104 to potentially extract multiple streams of media information using the channel 112 for simultaneous presentation thereat. This, in turn, enables the user to watch or record plural media programs at the same time. In another case, the communication channel 112 can provide plural streams for reception by different client devices within the household 110 which "feed" off the same channel 112.

In some cases the available bandwidth 114 remains substantially constant. However, more generally, the scheduling algorithms described herein can also be applied to the case where the bandwidth 114 varies over time. For example, the scheduling algorithms can be applied to the case where the bandwidth 114 is set at a first level at certain times of the day, and at a second level at other times of the day. Many other variable bandwidth scenarios are possible. In these cases, the scheduling algorithms determine the available bandwidth during the airing of future programs, and take this factor into account when scheduling the programs.

In some cases the bandwidth consumed by a program remains substantially constant, e.g., at a standard definition constant level, a high definition constant level, and so forth. However, the scheduling algorithms described herein can also be applied to the case where the amount of bandwidth consumed by a program varies over the course of the program. The scheduling algorithms can take this additional factor into account when scheduling these kinds of programs.

The client device 104 employs virtual tuner functionality (not shown) to receive media programs from the channel 112. For example, assume that the operations center 102 provides the media information via a multicast technique, such as the Internet Group Management Protocol (IGMP).

In the IGMP technique, a source of media information disseminates the media information to a group of recipients using a tree of distribution nodes. In this case, the virtual tuner functionality can "tune to" a media program by tapping into that multicast distribution of the media program; it can perform this task by locating an appropriate distribution node within the tree of such nodes.

Alternatively, assume that the operations center 102 provides the media information via a unicast technique. In the unicast technique, a source of media information provides a targeted dissemination of the media information to a recipient in one-to-one fashion. In this case, the virtual tuner functionality can "tune to" the media program by identifying the source that provides the media program (which may correspond, for example, to a server machine provided by the operations center 102). In still other cases, the virtual tuner functionality may use a combination of multicast and unicast techniques, or some other technique or techniques.

The operations center 102 includes acquisition functionality 122 for supplying the media information from one or more sources 124 of such information. The sources 124 can represent any kind of entity which produces or provides media information, such as cable or satellite television providers, one or more Video-On-Demand (VOD) providers, one or more publishing houses of information, one or more library sources, any kind of Internet-enabled repository, and so on. The media information received from these sources 124 can include video, audio, still pictures, and/or other multimedia content. The sources 124 of media programs may provide the media programs (or some subset thereof) in multiple different recording formats, such as SD, HD, PIP (thumbnail size), and so forth. This gives the user the option of viewing and recording the media programs in a preferred recording format.

The acquisition functionality 122 also receives media program guide information from a media program guide source 126. The media program guide source 126 can represent any kind of entity which produces or provides media program guide information, such as a commercial service which compiles and distributes electronic media program guide (EPG) information. The media program guide information typically identifies media events which will occur within an identified span of time, such as a 12 day span. The media program guide information can identify events by providing ID information which represents the events, the times at which the events will begin and end, and the sources (e.g., channels) which will present the events, and so forth.

The acquisition functionality 122 itself can comprise one or more server computers or other functionality dedicated to the task of retrieving the resource information.

The operations center 102 optionally includes an information content store 128 for storing the media information prior to its dissemination to the client devices (104, 106, . . . 108). The information content store 128 can be implemented as one or more databases and associated database management functionality.

The operations center 102 can also include information dissemination functionality 130 for supplying media information to the client devices (104, 106, . . . 108) via a coupling mechanism 132. Different systems may use the information dissemination functionality 130 in different ways. As described above, the system 100 may use the information dissemination functionality 130 to transmit media information to the client device 104, as received from the acquisition functionality 122 (or from some other source), in multicast fashion, unicast fashion, a combination of unicast and multicast fashion, or using some other communication technique.

The information dissemination functionality 130 can be implemented as a collection of server modules (not shown) that facilitate the transmission of media information to the client devices (104, 106, . . . 108). The server modules may provide redundant services, such that any of the server modules can be assigned to provide the same service to any of the client devices (104, 106, . . . 108).

Whatever delivery strategy is used, the operations center 102 can deliver media information to the client devices (104, 106, . . . 108) using a variety of packaging paradigms. In one case, the operations center 102 can supply a sequence of media programs to users in different channels. In this mode, the operations center 102 can present the media programs according to a fixed schedule, in the manner of traditional delivery of channels (although the channels may not have the frequency-specific connotation of traditional analog systems which use physical tuners). In another case, the operations center 102 can supply individual media programs to users at fixed times.

The media information itself can be expressed in any format, including, but not limited to, the MPEG-2 standard, Microsoft Corporation's VC-1 standard, the ISO/ITU H.264 standard, and so forth. The coded media information can be encapsulated into packets using any format, including, but not limited to, the Real Time Transport Protocol (RTP), the Real Time Streaming Protocol (RTSP), and so forth.

The coupling mechanism 132 couples the operations center 102 to the client devices (104, 106, . . . 108). This coupling mechanism 132 can be implemented in different ways to suit different technical and commercial environments. For instance, the coupling mechanism 132 can include any kind of network (or combination of networks), such as a wide area network (e.g., the Internet), an intranet, Digital Subscriber Line (DSL) network infrastructure, point-to-point coupling infrastructure, and so on. The coupling mechanism 132 can use or involve any kind of protocol or combination of protocols. In the case where one or more digital networks are used to disseminate information, the coupling mechanism 132 can include various hardwired and/or wireless links, routers, gateways, name servers, and so on. In the case where DSL infrastructure is used to disseminate information, the coupling mechanism 130 can utilize the services, in part, of telephone coupling infrastructure and DSL processing functionality.

The coupling mechanism 132 permits two-way communication between the operations center 102 and the client devices (104, 106, . . . 108). For example, this two-way communication enables the client device 104 to send schedule selections to the operations center 102 (via path 134), and enables the operations center 102 to send recording instructions and media information to the client device 104 (via path 112 for household 110). The channel 112 connecting the operations center 102 to the client device 104 can be implemented using the same communication mechanism as the channel 134 connecting the client device 104 to the operations center 102; alternatively, these channels can be implemented using different communication mechanisms.

Now referring to the client-side aspects of the system 100, the client devices (104, 106, . . . 108) themselves can be implemented in different ways. Any given client device (104, 106, . . . 108) may represent a television set with integral IP interfacing/processing functionality, a television set with an associated set-top box coupled thereto, a digital video recorder (DVR) device, a rewritable digital video disc (DVD-RW) device, a personal computer having AV decoding functionality, and so forth (as well as any combination of these devices). Or a given client device (104, 106, ... 108) can take the form of a personal mobile telephone, personal digital assistant (PDA), tablet-type computer device, any kind of wearable computer (e.g., a wristwatch-type computer device), and so forth.

In whatever manner the client devices (104, 106, ... 108) are implemented, they can comprise a media processing module that is communicatively coupled to a media presentation module. For instance, the client device 104 includes media processing module 136 coupled to media presentation module 138, the client device 106 includes media processing module 140 coupled to media presentation module 142, and the client device 108 includes media processing module 144 coupled to media presentation module 146. The media processing modules (136, 140, ... 144) may comprise functionality for processing the media information, and the media presentation modules (138, 142, ... 146) may comprise functionality for presenting the output of the media presentation modules (136, 140, ... 144). The media processing modules (136, 140, ... 144) can be integrated with the media presentation modules (138, 142, ... 146) (e.g., in the case where the media processing modules are integrated into respective IP-ready television sets), or the media processing modules (136, 140, ... 144) can be separate from (but coupled to) the media presentation modules (138, 142, ... 146) (e.g., in the case where the media processing modules are housed in respective set-top boxes that are coupled to television sets).

As described above, the representative client device 104 includes the media processing module 136, which, in turn, can comprise optional client-side schedule handling functionality 118. If present, this schedule handling functionality 118 performs whatever tasks are required to cooperate with the scheduling functionality 116 deployed at the operations center 102. Finally, the media processing device 104 also includes the local storage 120. The local store 120 can be used to store streams of media information in response to instructions from the operations center 102, and so forth.

Bandwidth Constraints and Allocation

Assume by way of example only that the communication channel 112 to a particular residence provides a maximum ingress bandwidth of 24 Mbps and can support a maximum of four streams of media programs. Assume further that a media program can be provided in different recording qualities, such as a standard definition (SD) recording quality and a high definition (HD) recording quality. An SD media program stream consumes approximately 3 Mbps or less and an HD media program stream consumes approximately 4-9 Mbps.

In a conventional system, these constraints are imposed by assuming that all SD streams consume the maximum of 3 Mbps and all HD streams consume the maximum of 9 Mbps. In such a system the client device can receive content having a total bandwidth (referred to hereinafter as the "Calculated Maxbitrate") of:
  4 SD streams (total ingress bandwidth 4×3 Mbps=12 Mbps); or
  3 SD Streams and 1 HD stream (total ingress bandwidth is 3×3 Mbps+1×9 Mbps=18 Mbps); or
  2 SD streams and 2 HD streams (total ingress bandwidth is 2×3 Mbps+2×9 Mbps=24 Mbps).

Thus, the system can stream a maximum of 2 HD streams at the same time to this residence. Typically, the operations center 102 (e.g., servers associated with information dissemination functionality 130) will maintain an Ingress Profile for each subscriber or subscriber residence which specifies both the maximum ingress bandwidth (referred to hereinafter as the "Specified Maxbitrate") and the maximum number of SD and HD media program streams that can be simultaneously streamed to the subscriber residence.

In the system 100 described herein, instead of assuming a bitrate for each media program stream as in the conventional system, the client device is able to retrieve in real time the bitrate of each stream as it is being received and from that calculate the actual bandwidth being consumed. As a consequence the system 100 does not have to assume that all HD streams consume the maximum bandwidth of 9 Mbps. Since most HD streams consume less than the maximum bitrate of 9 Mbps that is assumed in the conventional system, the ability to retrieve, measure or otherwise obtain the actual bandwidth of the streams being received may allow the client device to receive, for example, more HD streams than can be received by a client device in a conventional system that makes assumptions about the bit rate of the med programs being received.

For example, given the same illustrative constraints used in the above example in which the communication channel 112 provides a maximum ingress bandwidth of 24 Mbps and four media programs streams, the system 100 can stream to the client device:
  4 SD streams; or
  3 SD streams and 1 HD streams; or
  2 SD streams and 2 HD streams; or
  3 HD streams (as long as the total is less than 24 Mbps); or
  1 SD streams and 3 HD streams (as long as the total is less than 24 Mbps); or
  4 HD streams (as long as the total is less than 24 Mbps).

The client device may obtain the real-time ingress bandwidth in any of a variety of different ways. For example, the client device may make calls to the operations center 102 requesting this information. As another example, in some cases the client device itself may be able to calculate or otherwise determine the real-time ingress bandwidth from an examination of the media program streams being received.

Scheduling and Scheduling Conflicts

The system 100 provides scheduling functionality that uses the above-described constraints when it schedules the recordation of media programs for consumption by the client device 104. In one case, the scheduling functionality can be implemented at the operations center 102 as OC scheduling functionality 116. In this implementation, the OC scheduling functionality 116 maintains schedules for all of the client devices (104, 106, ... 108) at the operations center 102 site. In another case, the scheduling functionality can be implemented as client-side schedule handling functionality 118 that is located at the representative client device 104. (As mentioned above, this discussion will focus on representative client device 104; but other client devices can implement their own respective client-side schedule handling functionality, and what is set forth with respect to client device 104 applies to other client devices with equal force.) In still another case, the scheduling functionality can be implemented in distributed fashion by a combination of functionality provided at the operations center 102 and the client device 104. To facilitate discussion, and to provide one concrete example, the remainder of the discussion will assume that the core of the scheduling functionality is implemented at the operations center 102 by the OC scheduling functionality 116.

The purpose of the scheduling functionality 116 with respect to representative client device 104 is to maintain a schedule for the client device 104 that determines the timing at which the client device 104 should record media programs provided by the operations center 102. To perform in this manner, the user of the client device 104 can forward scheduling instructions to the scheduling functionality 116 to create a schedule. The scheduling functionality 116 can then, in turn, send down recording instructions to the client device 104 when the schedule indicates that it is time to record the media programs identified in the schedule. The client device 104 then proceeds to record the identified media programs in a local store 120.

In other implementations, the schedule can be used to determine the streaming of one or media programs to the client device 104 without necessarily requiring the recordation of these media programs at the client device 104. In other words, the schedule may instruct the client device 104 to tune to plural programs at the same time, and the client device 104 can simply present these programs at the same time, e.g., in picture-in-picture fashion or some other fashion (without necessarily recording these programs). Or the client device 104 can record some programs that it receives but not others.

In any case, the scheduling functionality 116 applies the above-identified constraints to assess the presence of conflicts in a schedule. More specifically, a conflict exists when, at any given point in time within a schedule, one or more of the above-identified constraints are not met. Namely, at these points in time, the schedule is attempting to record media programs that consume, in aggregate, more bandwidth than is available.

A conflict may arise due to different kinds of events. In one case, a user may add a new media program to a schedule which creates a conflict with one or more pre-existing media programs in the schedule. Or the user may modify an existing media program in the schedule such that it now interferes with one or more other media programs in the schedule. For example, suppose that the available bandwidth 114 will accommodate the receipt of two HD media programs at the same time. If the user attempts to record three HD media programs at the same time, then the user will have created a conflict (because the communication channel 112 cannot possibly supply the required amount of media information, unless it is possible to substitute one or more SD media programs in place of one or more HD media program counterparts). In another case, a conflict may arise due to changes in the media program guide information. For instance, suppose that a schedule is based on the assumption that a media program will air at time X, but then new media program guide information arrives which changes the airing of the scheduled media program to time Y. This new airing time may create a conflict with one or more other media programs in the schedule.

In another case, a conflict may arise due to any other event in the system 100 which consumes the allotted bandwidth 114, therefore making it impossible to receive one or more previously scheduled media programs. For example, assume that a personal computer (not shown) in the household 110 shares the communication channel 112 with the client device 104. The computer may consume bandwidth in interacting with the Internet (or some other entity), thereby reducing the total amount of available bandwidth 114 that can be consumed by the client device 104. Thus, when the computer is in operation, it may create conflicts with programs being concurrently streamed to the client device 104 according to a schedule. In any of the above cases, when a change to any entry in the schedule occurs, it can have a ripple effect which impacts other entries. This is because all of the entries draw from the common pool of bandwidth 114, so that a reduction to this common pool can potentially affect many entries in the schedule.

The types of conflicts that may arise may be categorized as stream-based conflicts, bandwidth-based conflicts, or both stream-based and bandwidth-based conflicts. In a stream-based conflict, the maximum number of allowable media program streams is exceeded. In a bandwidth-based conflict, the specified Maxbitrate is exceeded. In a stream-based and bandwidth-based conflict, both the maximum number of allowable media program streams and the specified Maxbitrate is exceeded.

If the specified Maxbitrate listed in the Ingress Profile is greater than or equal to the Calculated Maxbitrate determined or obtained by the client device, then any conflicts will be stream-based. On the other hand, if the specified Maxbitrate is less than the Calculated Maxbitrate, then bandwidth-based conflicts may arise.

The manner in which conflicts may be handled by the scheduler device will be discussed below.

Illustrative Scheduler

Figure 2:
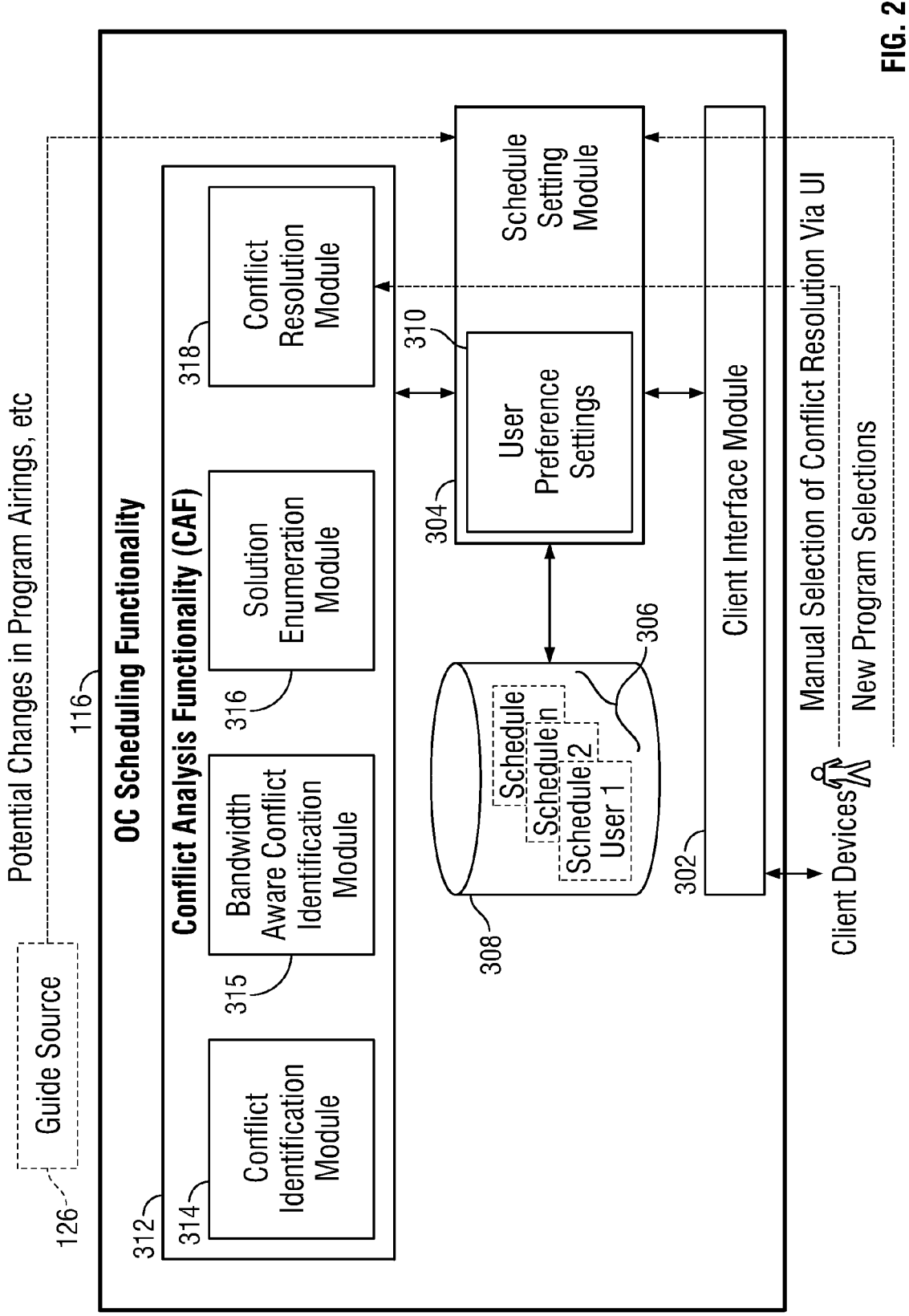
FIG. 2 shows exemplary details of the scheduling functionality illustrated in FIG. 1.

FIG. 2 shows exemplary details of the scheduling functionality 116. The components shown in FIG. 2 can be located together at a single head-end site or distributed over plural sites. In general, the logic shown in FIG. 2 is exemplary; other functionality can apply different logic modules to implement the basic design principles described herein.

To begin with, the scheduling functionality 116 includes a client interface module 302 for use in interacting with the client devices (104, 106, . . . 108) and associated users.

The scheduling functionality 116 also includes a schedule setting module 304 which provides functionality for creating, reviewing and revising schedules 306. The schedule setting module 304 stores these schedules 306 in a schedule store 308. The schedules 306 govern the recording of media information (such as television media programs) for playback at the respective client devices (104, 106, . . . 108). (Alternatively, the client devices can store their own respective schedules in their local stores, delegating the processing of these schedules to the head-end scheduling functionality 116.) Each schedule can include one or more entries which describe associated media presentation media programs. For example, an entry may describe a media program by identifying its start time, end time, source (e.g., channel on which it will be presented), and other salient characteristics of the media program.

In creating schedules, the scheduling setting module 304 can access both the guide source information (from the guide source 126) and user preference information 310. The media program guide information specifies what media programs are airing at particular times and on particular channels. The media program guide information may also specify the available formats of the media programs (such as SD, HD, etc.). The user preference information 310 indicates the recording preferences of the users, e.g., regarding the format to be used to record media programs selected by the users. For example, a user of client device 104 may indicate that she prefers that all media programs should be recorded in HD format, except for news media programs (which should be recorded in SD format). If this user then adds a new media program to a schedule, the schedule setting module 304 can be configured to automatically create an entry in the schedule that specifies a media program version having the desired recording format (if that format is available).

As described above, different events may cause a recording conflict. One such event arises when the user adds a new media program to a schedule which happens to conflict with one or more pre-existing media programs (because, for one or more time segments, recording all of the specified media programs would require more bandwidth than is available). Another event arises when the user modifies a pre-existing media program so that it now interferes with one or more other media programs in the schedule. Another event arises when the provider of the media program guide information changes the timing or format of a scheduled media program so that it now conflicts with one or more other media programs in the schedule. Yet additional causes of conflicts are possible.

In the case of a conflict, the scheduling functionality 116 employs conflict analysis functionality 312 to identify and resolve the conflict. The representative conflict analysis functionality 312 includes a number of modules to perform different aspects of its responsibilities.

First, a preliminary conflict identification module 314 identifies conflicts in a schedule which can be determined without actual knowledge of the bandwidth being consumed by a media program as it is being received by the client device. For example, the preliminary conflict identification module 314 may identify stream-based conflicts when a recording scheduling includes more simultaneous or overlapping media programs than are allowed by the Ingress Profile. In another example, the preliminary conflict identification module 314 may identify bandwidth-based conflicts when a recording scheduling includes, for instance, simultaneous or overlapping HD media programs which exceed the Specified Maxbitrate listed in the Ingress Profile even assuming that each of the HD program streams consume the minimum required bandwidth for an HD program.

Next, a bandwidth aware conflict identification module 315 identifies conflicts in a schedule by examining the bit rate of the media program streams as they are being received and calculates the actual bandwidth being consumed. If it is found that the real-time ingress bandwidth exceeds the Specified Maxbitrate, then a conflict exists. For example, the bandwidth aware conflict identification module 315 may in general identify bandwidth-based conflicts as well as stream- and bandwidth-based conflicts.

A solution enumeration module 316 enumerates solutions to the conflicts identified by the conflict identification module 314. A wide variety of techniques and algorithms may be employed by solution enumeration module 316 to resolve conflicts. In one illustrative example, the solution enumeration module 316 steps through a series of rules to present one or more options to the user. The options may present the user with one or more media programs that can be canceled to resolve the conflict.

The illustrative rules 1-4 presented below may be followed in the order in which they are presented or, alternatively, in some other order of priority.

1. Preserve series recordings
   a. If there is no series recording, this rule will not be valid and will be omitted from the option buttons.
   b. After preserving series recording(s), the scheduler will cancel the least non-series recordings from the recording list returned from the server which satisfy the bitrate or stream number limits.

2. Preserve HD recordings
   a. If all the conflicting recordings are HD media programs or non-HD media programs, this rule cannot be satisfied and should be omitted.
   b. If there is not enough SD media programs which the scheduler can cancel to accommodate the new recording, this rule is omitted.
   c. After preserving HD recording(s), the scheduler will cancel the least non-HD media program from the recording list returned from the server which satisfies the bitrate or stream number limits.

3. Cancel the fewest number of media programs.

4. Preserve movies, sports, and special events. Since the scheduler does is generally not able to determine which scheduled recordings are movies, sports, or special events, the scheduler may preserve any scheduled recording that is longer than some period of time (e.g., 1.5 hours).

Since each of the above rules can have multiple results, the scheduler may loop through the rules and gather the most optimal results. When the scheduler encounters duplicate results, it may omit the duplicate result and skip to the next rule. The scheduler will cycle through the rules in an iterative fashion to first gather the most optimal results and then sub-optimal results until either a specified number of options (e.g., 3) are available for presentation to the user or until the scheduler has exhausted all calculations.

Finally, returning to FIG. 2 conflict analysis functionality 312 includes a conflict resolution module 318. The conflict resolution module 318 resolves the conflicts assessed by the preliminary conflict identification module 314 and bandwidth-based conflict identification module 315 using one or more of the solutions determined by the solution enumeration module 316. For example, assume that the conflict arises when three HD programs to be recorded at the same time all consume the maximum bitrate for HD programs so that the total ingress bandwidth exceeds the Specified Maxbitrate listed in the Ingress Profile. At this time, the conflict resolution module 318 can alert the user to the conflict and its possible solutions, and then allow the user to manually select one or more of the solutions. If a user is not available to manually resolve the conflict, then the conflict analysis functionality 312 can attempt to automatically resolve the conflict based on various rules such as those mentioned above.

Illustrative Client Device

Figure 3:
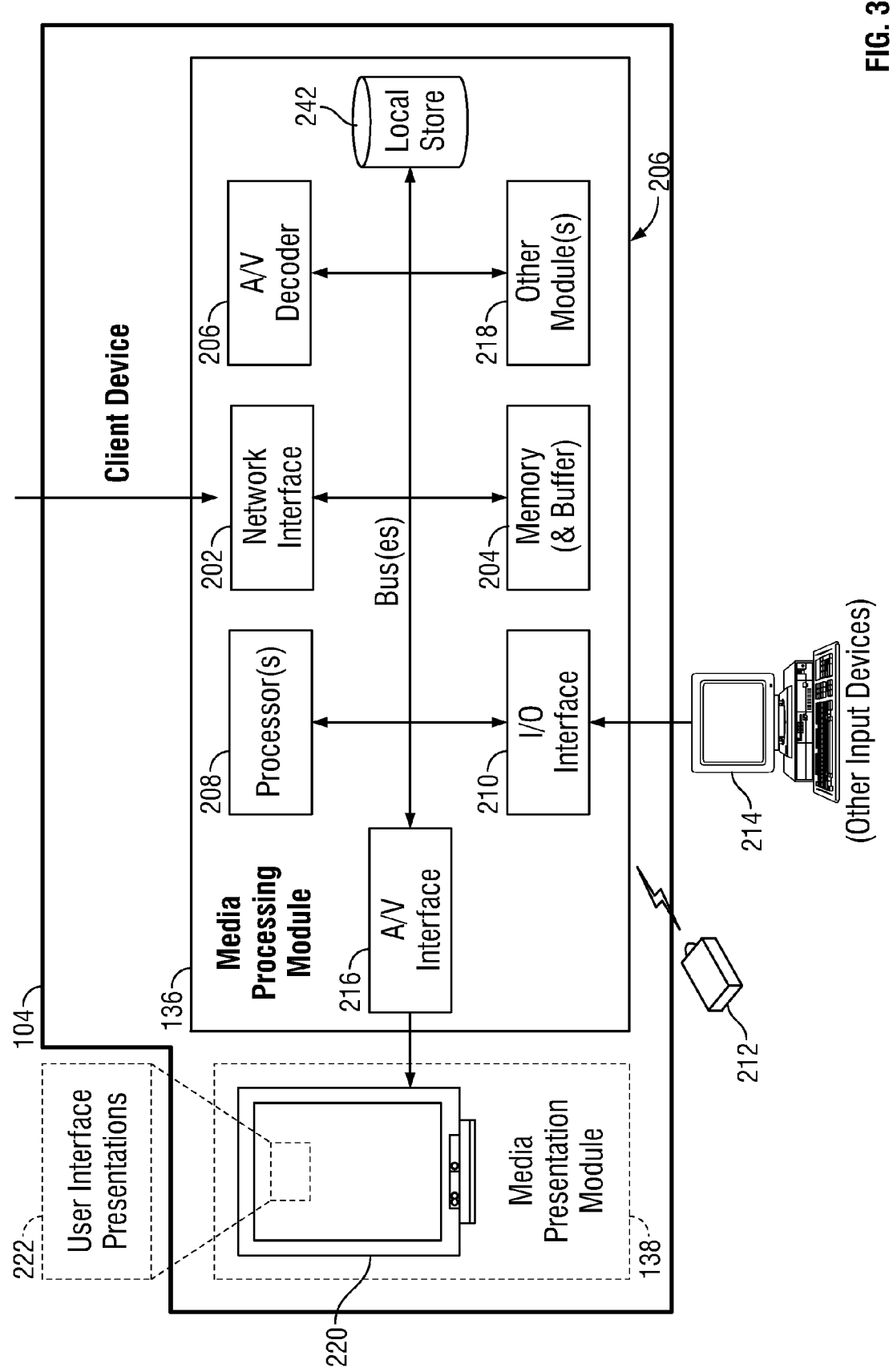
FIG. 3 shows one example of a client device.

FIG. 3 provides additional details regarding the representative client device 104 (introduced in the context of FIG. 1). The composition of the client device 104 shown in FIG. 3 is merely representative of one of many possible implementations.

The client device 104 comprises the above-identified media processing module 136 coupled to the media presentation module 138. In one case, the media processing module 136 can comprise AV processing functionality combined with the media presentation module 138 in a single integrated device (e.g., a single IP-ready television set). In another case, the media processing module 136 can comprise a separate set-top box or DVR unit (or other kind of separate unit) that communicatively couples to the media presentation module 138 (e.g., a television screen).

The media processing module 136 can include a number of modules for performing its assigned tasks. To begin with, the media processing module 136 includes a network interface module 202. The network interface module 202 can represent any functionality for receiving media information from the operations center 102 using any coupling mechanism. For example, the network interface module 202 can comprise an Ethernet NIC, a DSL modem, a cable modem, a wireless network interface, or other kind of network interface equipment.

The media processing module 136 also includes memory 204. A portion of the memory 204 can comprise a FIFO-type buffer for storing media information prior to the information being decoded.

The media processing module 136 also includes an audio-visual (AV) decoder 206 for decoding (and decompressing) the received media information into its video and audio components. Decoding comprises ordering packets (if received out of order), extracting media information from the stream of received packets, and also extracting timing information that will govern the playback of the media information. The decoder 206 can also implement the virtual tuner functionality described above, e.g., by including logic for tuning to one or more identified streams of media information using a unicast and/or multicast technique, or some other technique.

The media processing module 136 also includes one or more processors 208 for executing instructions to implement the functionality of the media processing module 228.

The media processing module 136 also includes an I/O interface 210 for interacting with the user via one or more input devices (e.g., a remote controller 212, a PC 214, a joy stick (not shown), a touch screen input mechanism (not shown), and so forth).

The media processing module 136 also includes an A/V interface module 216 for providing media information in an appropriate format (e.g., in an appropriate color space) to the media presentation module 138.

The media processing module 136 also includes the above-identified local store 120 for storing media information and/or other information. In general, any combination of storage devices (e.g., memory 204, local store 120, etc.) deployed by the client device 104 can be used to store instructions which implement the client-side schedule handling functionality 118 (if this optional client-side functionality is used).

Finally, the client processing module 136 can include various other modules 218, not specifically enumerated in the figure. For instance, the client processing module 136 can include a graphics compositor for combining a video component of the media information from the AV decoder 206 on a frame-by-frame basis with graphics information. The graphics information may comprise various user interface presentations which are overlaid on the media information.

The media presentation module 138 may comprise any kind of device for presenting AV information, including a CRT-type device, an LCD-type device, and so forth. In any case, the media presentation module 138 defines a display surface 220. The media processing module 136 can present one or more user interface presentations 222 on the display surface 220. For example, a user interface presentation (not shown) can be provided which allows the user to create, review and revise a schedule. This interface can be provided by the scheduling functionality 116 (of the operations center 102) or locally by the client-side schedule handling functionality 118 (or by a combination of such functionality).

Illustrative Methods

Figure 4:
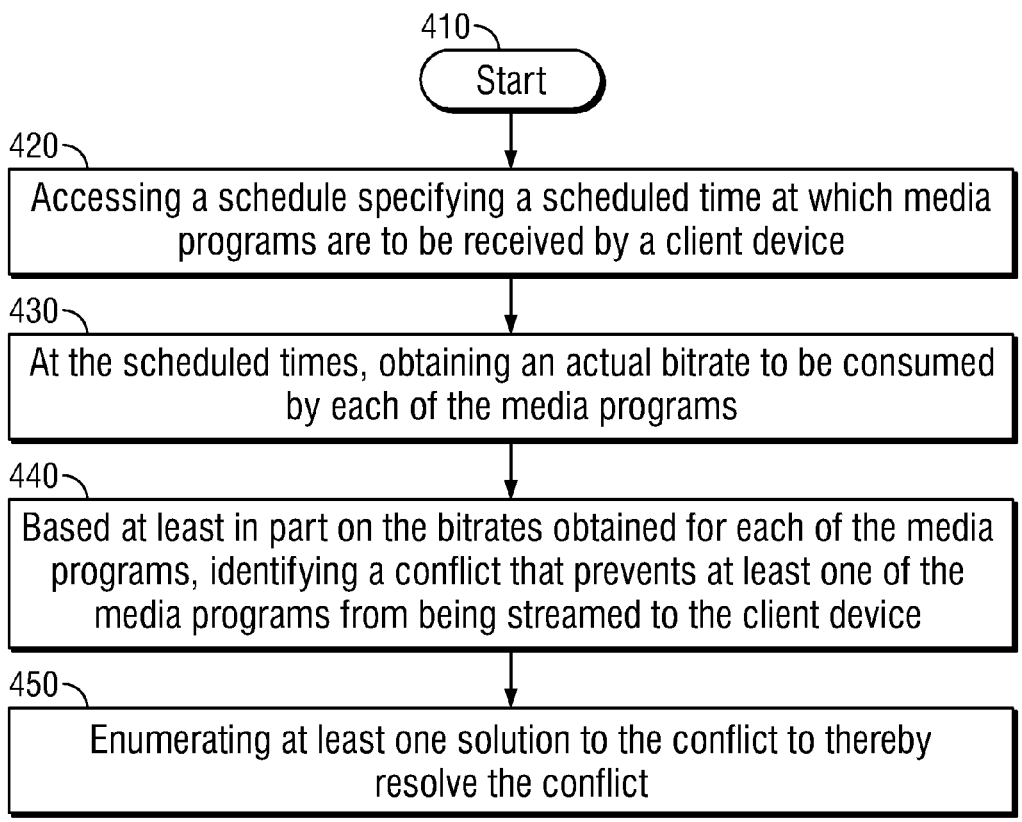
FIG. 4 is flowchart showing one example of a method for identifying a schedule conflict that affects a client device receiving multiple media programs over a network.

FIG. 4 is flowchart showing one example of a method for identifying a schedule conflict that affects a client device receiving multiple media programs over a network. The method beings at block 410 and continues to block 420, where the scheduler accesses a schedule that specifies a scheduled time at which each of a plurality of media programs are to be received by a client device. at the scheduled times, a bitrate to be consumed by each of the media programs is obtained at block 430 as they are to be streamed to the client device. Based at least in part on the bitrates obtained for each of the media programs, a conflict is identified at block 440 that prevents at least one of the media programs from being streamed to the client device over the network. At least one solution to the conflict is enumerated by the scheduler at block 450 to thereby resolve the conflict.

Figure 5:
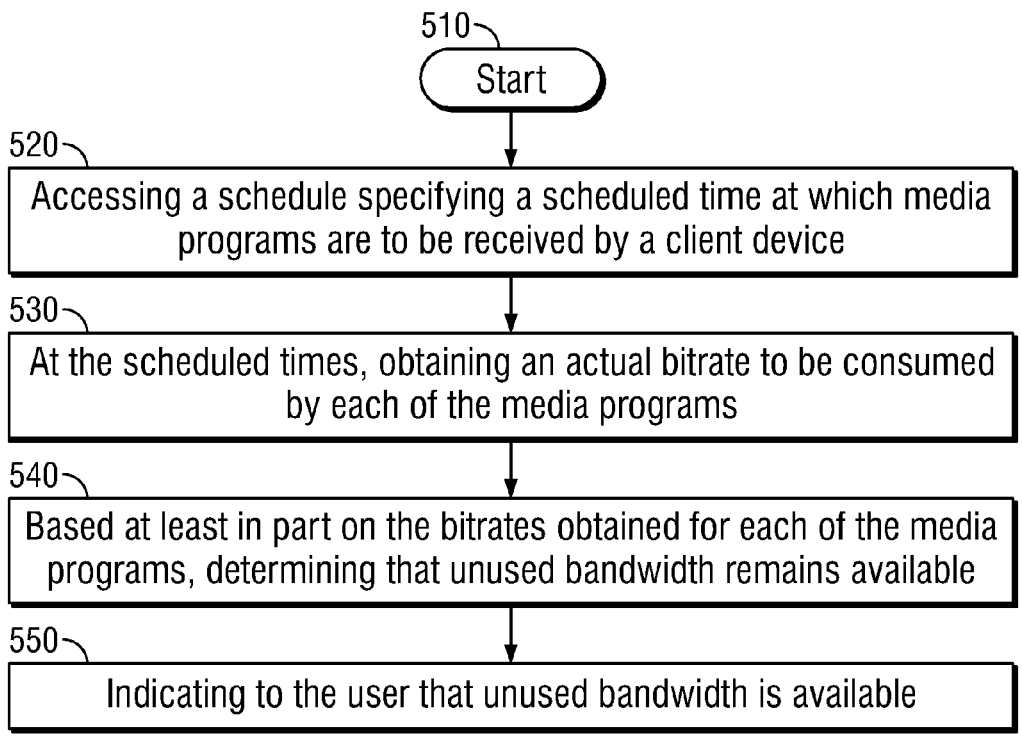
FIG. 5 is a flowchart showing one example of a method by which a scheduler recognizes that there is unused bandwidth available and indicates such to a user of the client device.

FIG. 5 is a flowchart showing one example of a method by which a scheduler recognizes that there is unused bandwidth available and indicates such to a user of the client device.

The method beings at block 510 and continues to block 520, where the scheduler accesses a schedule that specifies a scheduled time at which each of a plurality of media programs are to be received by a client device. at the scheduled times, a bitrate to be consumed by each of the media programs is obtained at block 530 as they are to be streamed to the client device. Based at least in part on the bitrates obtained for each of the media programs, the scheduler determines at block 540 that unused bandwidth remains available to the client device at the one or more scheduled times. This may arise, for instance, because one or more HD media programs that are scheduled for recording only consume the minimum amount of bandwidth that HD programs may consume. At block 550 the scheduler indicates to the user that unused bandwidth is available. This may allow the user to take any of a number of actions. For example, if a SD media program is also scheduled for recording, the user may upgrade the recording from SD to HD to thereby make use of the unused bandwidth.

The claimed subject matter may be implemented as a method, apparatus, or article of manufacture using standard programming and/or engineering techniques to produce software, firmware, hardware, or any combination thereof to control a computer to implement the disclosed subject matter. For instance, the claimed subject matter may be implemented as a computer-readable storage medium embedded with a computer executable program, which encompasses a computer program accessible from any computer-readable storage device or storage media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). However, computer readable storage media do not include transitory forms of storage such as propagating signals, for example. Of course, those skilled in the art will recognize many modifications may be made to this configuration without departing from the scope or spirit of the claimed subject matter.

Although the subject matter has been described in language specific to structural features and/or methodological acts, it is to be understood that the subject matter defined in the appended claims is not necessarily limited to the specific features or acts described above. Rather, the specific features and acts described.

The invention claimed is:

1. A method of identifying a schedule conflict that affects a client device receiving multiple media programs over a network, comprising:

accessing a schedule that specifies a scheduled time at which each of a plurality of media programs are to be received by a client device;

at the scheduled times, obtaining an actual bitrate to be consumed by each of the media programs as they are to be streamed to the client device;

accessing a profile associated with the client device, the profile specifying a maximum number of the media program streams that can be simultaneously streamed to the client device and a maximum bandwidth available to the client device within which the maximum number of the media program streams are accommodate;

comparing a sum of the actual bitrates to be obtained by the client device to the maximum bandwidth available to the client device;

based at least in part on the comparison, identifying a conflict between the actual bitrates and a capacity of a communication channel to deliver the actual bitrates to the client device that prevents at least one of the media programs from being recorded by the client device; and enumerating at least one solution to the conflict to thereby resolve the conflict.

2. The method of claim 1 further comprising enumerating the at least one solution by identifying one or more of the media programs that are to be canceled.

3. The method of claim 1 in which enumerating the at least one solution includes resolving the conflict using an iterative set of pre-established rules.

4. The method of claim 3 in which the pre-established rules include first prioritizing preservation of media programs associated with series scheduled for recording by the client device and then prioritizing preservation of High Definition (HD) media programs scheduled for recording.

5. The method of claim 4 in which the pre-established rules further include, after preserving the HD media programs, selecting one or more remaining media programs to be recorded such that a minimum of media programs are canceled.

6. The method of claim 5 in which the pre-established rules further include, after selecting the one or more remaining media programs, prioritizing preservation of media programs that include content relating to a movie or a sporting or other special event.

7. The method of claim 1 in which the at least one solution includes a plurality of solutions and further comprising presenting a user of the client device with the plurality of solutions so that the user is able to select one of the solutions through a user interface.

8. The method of claim 1 in which obtaining the bitrate consumed be each of the media programs includes calling a network operator over the network to request the bitrates.

9. A scheduler associated with a client device receiving multiple media programs over a network, comprising:
   one or more hardware-based computer readable memory devices, not consisting of propagated signals;
   schedule setting programming logic embodied on the one or more computer readable memory devices and being configured to establish a schedule that specifies a scheduled time at which each of a plurality of media programs are to be received by a client device;
   conflict identification programming logic embodied on the one or more computer readable memory devices and being configured to
      obtain an actual bitrate to be consumed by each of the media programs as they are to be streamed to the client device,
      access a profile associated with the client device wherein the profile includes information regarding a maximum number of the media program streams and a maximum bandwidth that can be provided to the client device and,
      based at least in part on the actual bitrates obtaining for each of the media programs and the information in the profile, identify a conflict between the actual bitrates and the maximum bandwidth associated with the client device, that prevents at least one of the media programs from being recorded by the client device;
   solution enumeration module programming logic embodied on the one or more computer readable memory devices and being configured to enumerate at least one solution to the conflict by identifying one or more of the media programs that are to be canceled to thereby resolve the conflict.

10. The scheduler of claim 9 in which the solution enumeration module is further configured to enumerate the at least one solution by identifying one or more of the media programs that are to be canceled.

11. The scheduler of claim 9 in which the solution enumeration module is further configured to resolve the conflict using an iterative set of pre-established rules.

12. The scheduler of claim 11 in which the pre-established rules include first prioritizing preservation of media programs associated with series scheduled for recording by the client device and then prioritizing preservation of High Definition (HD) media programs scheduled for recording.

13. The scheduler of claim 12 in which the pre-established rules further include, after preserving the HD media programs, selecting one or more remaining media programs to be recorded such that a minimum of media programs are canceled.

14. The scheduler of claim 13 in which the pre-established rules further include, after selecting the one or more remaining media programs, prioritizing preservation of media programs that include content relating to a movie or a sporting or other special event.

15. The scheduler of claim 9 in which the conflict identification programming logic is further configured to obtain the bitrate consumed be each of the media programs by calling a network operator over the network to request the bitrates.

16. A method of determining when unused bandwidth remains available to a client device the method comprising the steps of:
   accessing a schedule that specifies a scheduled time at which each of a plurality of media programs are to be received by a client device;
   at the scheduled times, obtaining an actual bitrate to be consumed by each of the media programs as they are to be streamed to the client device;
   accessing a profile associated with the client device, the profile specifying a maximum number of the media program streams that can be simultaneously streamed to the client device and a maximum bandwidth available to the client device within which the maximum number of the media program streams are accommodated;
   comparing a sum of the actual bitrates to be obtained by the client device to the maximum bandwidth available to the client device;
   based at least in part on the comparison, determining that unused bandwidth remains available to the client device at the one or more scheduled times; and
   indicating to the user that unused bandwidth is available.

17. The method of claim 16 in which the method further comprises presenting a user of the client device with one or more options for consuming the unused bandwidth.

18. The method of claim 17 in which at least one of the options includes upgrading an SD media program currently being recorded to a HD media program.

\* \* \* \* \*